(12) United States Patent
Yoo et al.

(10) Patent No.: US 9,028,082 B2
(45) Date of Patent: May 12, 2015

(54) LIGHT SOURCE MODULE AND ILLUMINATION APPARATUS HAVING THE SAME

(71) Applicant: Samsung Electronics Co., Ltd., Gyeonggi-do (KR)

(72) Inventors: Cheol Jun Yoo, Chungcheongnam-do (KR); Young Hee Song, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 193 days.

(21) Appl. No.: 13/732,883

(22) Filed: Jan. 2, 2013

(65) Prior Publication Data

US 2013/0170178 A1    Jul. 4, 2013

(30) Foreign Application Priority Data

Jan. 2, 2012    (KR) .................. 10-2012-0000150

(51) Int. Cl.
| | |
|---|---|
| *F21K 99/00* | (2010.01) |
| *F21V 9/16* | (2006.01) |
| *G02B 6/42* | (2006.01) |
| *F21V 8/00* | (2006.01) |
| *F21V 13/02* | (2006.01) |
| *F21V 13/12* | (2006.01) |
| *F21V 29/00* | (2006.01) |
| *F21V 3/04* | (2006.01) |
| *F21V 15/01* | (2006.01) |
| *F21Y 101/02* | (2006.01) |

(Continued)

(52) U.S. Cl.
CPC ... *F21V 9/16* (2013.01); *F21K 9/30* (2013.01); *F21K 9/52* (2013.01); *F21K 9/56* (2013.01); *G02B 6/4298* (2013.01); *G02B 6/0003* (2013.01); *G02B 6/001* (2013.01); *F21V 13/02* (2013.01); *F21V 13/12* (2013.01); *F21V 29/2225* (2013.01); *F21V 29/2293* (2013.01); *F21K 9/17* (2013.01); *F21V 3/0418* (2013.01); *F21V 3/0436* (2013.01); *F21V 15/011* (2013.01); *F21Y 2101/02* (2013.01); *F21Y 2103/00* (2013.01); *F21Y 2103/022* (2013.01)

(58) Field of Classification Search
USPC ............... 362/230, 84, 249.02, 231
See application file for complete search history.

(56) References Cited

U.S. PATENT DOCUMENTS

| | | | | |
|---|---|---|---|---|
| 7,478,941 | B2 * | 1/2009 | Wu et al. ................ | 362/612 |
| 7,670,040 | B2 * | 3/2010 | Park ............... | 362/612 |

(Continued)

FOREIGN PATENT DOCUMENTS

| | | |
|---|---|---|
| KR | 10-0910658 B1 | 8/2009 |
| KR | 2010-0003457 A | 1/2010 |
| KR | 10-0986170 B1 | 10/2010 |

*Primary Examiner* — Anabel Ton
(74) *Attorney, Agent, or Firm* — McDermott Will & Emery LLP

(57) ABSTRACT

A light source module including: a cover unit having a pipe structure with one open end or two open ends; a cap unit coupled to the one open end or two open ends of the cover unit; a light source unit including a light emitting device, the light source unit mounted on the cap unit and covered by the cover unit; and a wavelength conversion unit disposed in an internal space of the cover unit and coupled to the light source unit while covering the light emitting device, the wavelength conversion unit converting a wavelength of light emitted from the light emitting device to allow the wavelength-converted light to be emitted through the cover unit.

19 Claims, 14 Drawing Sheets

(51) Int. Cl.
*F21Y 103/00* (2006.01)
*F21Y 103/02* (2006.01)

(56) References Cited

U.S. PATENT DOCUMENTS 7,722,211 B2 * 5/2010 Marra et al. .............. 362/227
7,946,729 B2 * 5/2011 Ivey et al. .............. 362/254
8,109,649 B2 * 2/2012 Son et al. .............. 362/230
8,517,550 B2 * 8/2013 Ramer et al. .............. 362/84
8,702,271 B2 * 4/2014 Rains et al. .............. 362/235
2011/0310587 A1 * 12/2011 Edmond et al. .............. 362/84
2014/0185269 A1 * 7/2014 Li .............. 362/84

* cited by examiner

US 9,028,082 B2

LIGHT SOURCE MODULE AND ILLUMINATION APPARATUS HAVING THE SAME

CROSS-REFERENCE TO RELATED APPLICATION

This application claims the priority of Korean Patent Application No. 10-2012-0000150 filed on Jan. 2, 2012, in the Korean Intellectual Property Office, the disclosure of which is incorporated herein by reference.

BACKGROUND OF THE DISCLOSURE

1. Field of the Disclosure

The present disclosure relates to a light source module and an illumination apparatus having the same.

2. Description of the Related Art

The application of light emitting diodes (LEDs) to indoor/outdoor illumination apparatuses is being accelerated. In particular, LEDs are prominently being applied to a bar-type illumination apparatus or a surface light source. However, technical requirements remain for a lifespan extension, maintenance of light quality (color temperature and color coordinates), and reductions in manufacturing costs.

In the case of a bar-type illumination apparatus as an alternative to a florescent lamp, light sources formed of chip-type or package-type LEDs are mounted lengthwise in a single array or a plurality of arrays, and are arranged to face a lamp cover in a direction toward a surface from which light is emitted.

In this case, the number of LEDs required to realize an elongated bar-type illumination apparatus may be significantly increased, whereby manufacturing costs may be increased, and failure to efficiently release heat during light emission may cause difficulties in ensuring lifespan and light quality.

SUMMARY OF THE DISCLOSURE

An aspect of the present disclosure provides a light source module and an illumination apparatus having the same, allowing for reductions in manufacturing costs and heat generation, by being manufactured with a reduced number of light emitting devices used as light sources, and securing a uniform quality of light.

According to an aspect of the present disclosure, there is provided a light source module including: a cover unit having a pipe structure with one open end or two open ends; a cap unit coupled to the one open end or two open ends of the cover unit; a light source unit including a light emitting device, the light source unit mounted on the cap unit and covered by the cover unit; and a wavelength conversion unit disposed in an internal space of the cover unit and coupled to the light source unit while covering the light emitting device, the wavelength conversion unit converting a wavelength of light emitted from the light emitting device to allow the wavelength-converted light to be emitted through the cover unit.

The wavelength conversion unit may have a pipe structure with one open end or two open ends, and is disposed parallel to the cover unit within the internal space of the cover unit.

The wavelength conversion unit may include a compound of a resin and a single type or a plurality of types of phosphor.

The wavelength conversion unit may include a light transmission tube having a double wall structure with an accommodating space between an outer and inner wall, and a wavelength conversion material disposed in the accommodating space.

The wavelength conversion material may include a compound of a resin and a single type or a plurality of types of phosphor, or a liquid-state quantum dot phosphor.

The wavelength conversion unit may include a light transmission tube, wherein a compound of a resin and a single type or a plurality of types of phosphor is coated on at least one of an inner peripheral surface and an outer peripheral surface of the light transmission tube.

The wavelength conversion unit may further include a core formed of a light guide material disposed in an internal space of the wavelength conversion unit.

The cover unit and the wavelength conversion unit may have a straight or curved pipe structure.

The light source unit may include a substrate having the light emitting device mounted thereon; and a reflecting part formed on the substrate and having an inner reflective surface in a central portion thereof exposed to the light emitting device, the inner reflective surface reflecting the light emitted from the light emitting device inwardly to the wavelength conversion unit.

The reflecting part may have a coupling groove at an edge of the inner reflective surface facing the wavelength conversion unit, the coupling groove having one end of the wavelength conversion unit coupled thereto, and the wavelength conversion unit coupled to the coupling groove may be fixed to face the light emitting device.

The light source unit may further include a lens covering the light emitting device and disposed in a space surrounded by the inner reflective surface.

The light source unit may further include a sealing part which seals the light emitting device and which is disposed in a space surrounded by the inner reflective surface.

The light source module may further include an auxiliary reflecting part disposed on an inner surface of a closed end of the cover unit having one open end, and coupled to the wavelength conversion unit to thereby fix the wavelength conversion unit together with the light source unit, the wavelength conversion unit having one end coupled to the light source unit and another end coupled to the auxiliary reflecting part.

The cap unit may include an external terminal having one end protruding outwardly and another end electrically connected to the light emitting device and supplying power to the light emitting device.

According to another aspect of the present disclosure, there is provided an illumination apparatus including: a light source module including a cover unit having a pipe structure with one open end or two open ends, a cap unit coupled to the one open end or two open ends of the cover unit, a light source unit including a light emitting device, the light source unit mounted on the cap unit and covered by the cover unit, and a wavelength conversion unit disposed in an internal space of the cover unit and coupled to the light source unit while covering the light emitting device, the wavelength conversion unit converting a wavelength of light emitted from the light emitting device to allow the wavelength-converted light to be emitted through the cover unit; and a frame unit including one or more light source modules detachably mounted thereon and supplying power to the one or more light source modules.

The frame unit may include at least two light source modules detachably mounted thereon, the at least two light source modules may be arranged in at least one of a horizontal and vertical direction.

The one or more light source modules may be arranged in a circular manner.

The frame unit may further include a heat sink releasing heat generated in the one or more light source modules outwardly.

The heat sink may include at least one of one or more heat dissipation holes and a heat dissipation fin.

According to another aspect of the present disclosure, there is provided a light source module including: a housing; a light source unit for emitting light; and a wavelength conversion unit for converting a wavelength of light emitted from the light source unit, wherein the light source unit and wavelength conversion unit are arranged within an internal space of the housing such that at least a portion of the light emitted from the light source unit passes through the wavelength conversion unit.

The light source module may further include a reflecting part for reflecting light emitted from the light source unit to the wavelength conversion unit.

The reflecting part may extend from the light source unit to the wavelength conversion unit.

The reflecting part may include an inner reflective surface extending from the light source unit to the wavelength conversion unit and an outer reflective surface extending from an outer surface of the wavelength conversion unit to an inner surface of the housing.

The light source module may further include an external terminal having one end protruding outwardly from an end of the housing and another end electrically connected to the light source unit for supplying power to the light source unit.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1A:
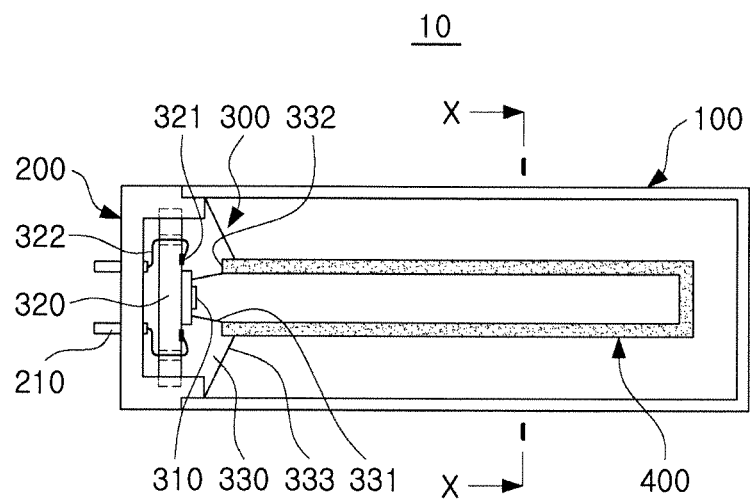
FIG. 1A is a schematic cross-sectional view illustrating a light source module according to an embodiment of the present disclosure.

Embodiments of the present disclosure will now be described in detail with reference to the accompanying drawings. The disclosure may, however, be embodied in many different forms and should not be construed as being limited to the embodiments set forth herein. Rather, these exemplary embodiments are provided so that this disclosure will be thorough and complete, and will properly convey the disclosed scope to those of ordinary skill in the art. In the drawings, the shapes and dimensions of components may be exaggerated for clarity, and the same reference numerals may be used throughout to designate the same or like components.

A light source module according to an embodiment of the present disclosure will be described with reference to FIGS. 1A through 6B.

Figure 1B:
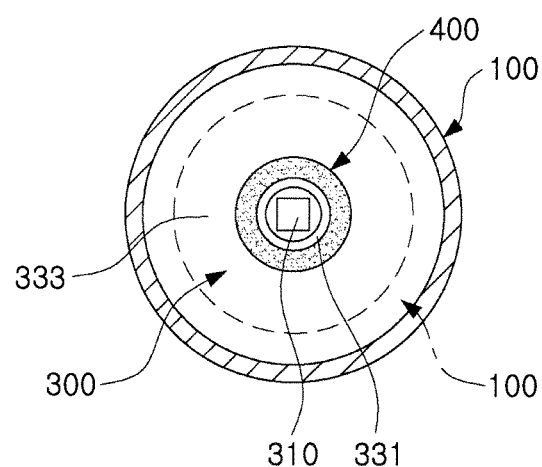
FIG. 1B is a schematic cross-sectional view, taken along line X-X of FIG. 1A.
Figure 2A:
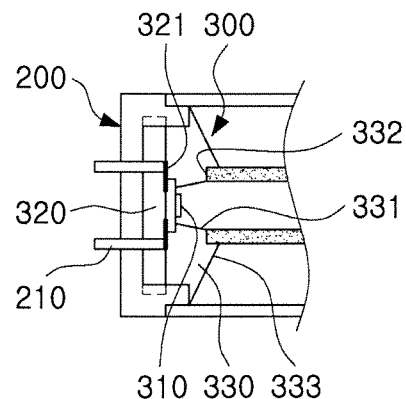
FIGS. 2A and 2B are schematic cross-sectional views illustrating modifications of an external terminal applicable to a cap unit of FIG. 1.
Figure 2B:
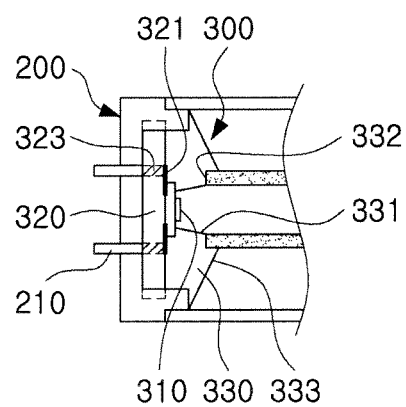
Figure 3A:
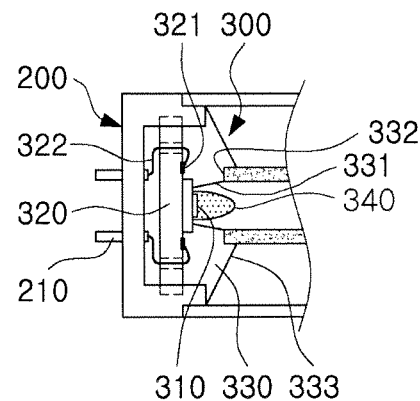
FIGS. 3A and 3B are schematic cross-sectional views illustrating modifications of a light source unit of FIG. 1.
Figure 3B:
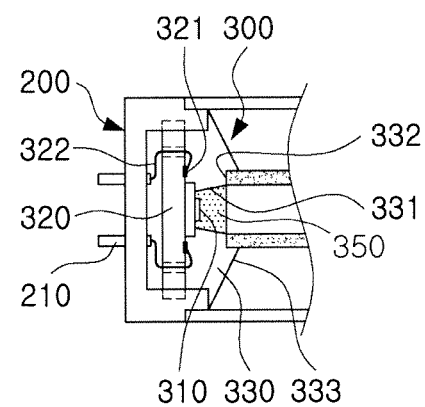
Figure 4A:
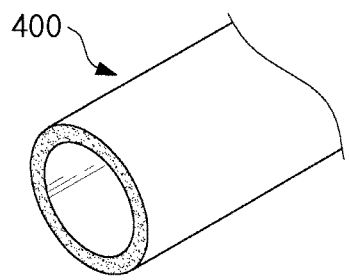
FIGS. 4A through 4C are views schematically illustrating examples of a wavelength conversion unit of FIG. 1.
Figure 4B:
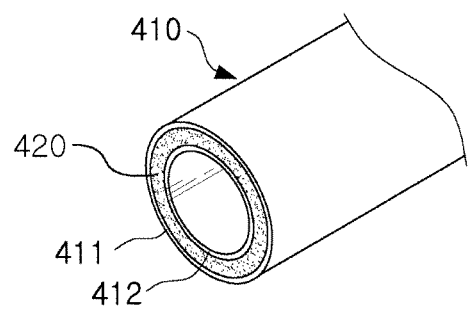
Figure 4C:
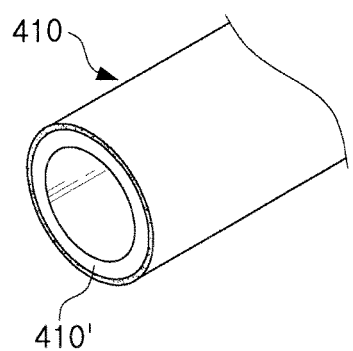
Figure 5A:
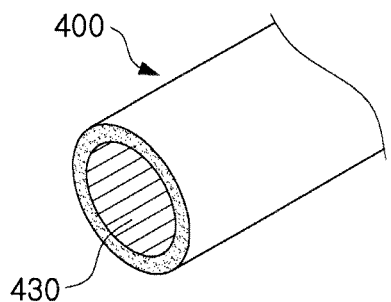
FIGS. 5A through 5C are views schematically illustrating modifications of the wavelength conversion unit of FIGS. 4A through 4C.
Figure 5B:
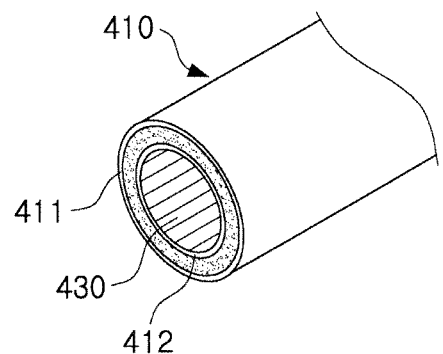
Figure 5C:
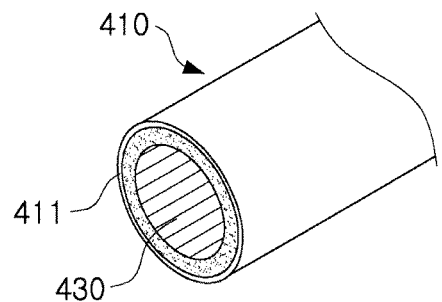
Figure 6A:
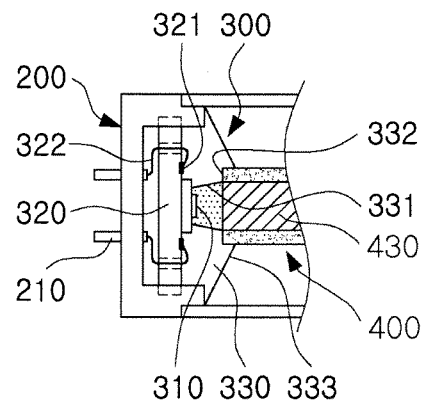
FIGS. 6A and 6B are schematic cross-sectional views illustrating modifications of the wavelength conversion unit and the light source unit of FIG. 1.
Figure 6B:
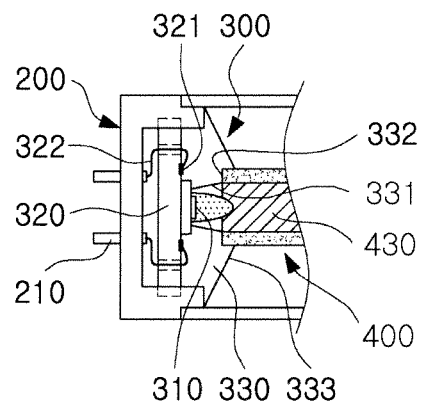

FIG. 1A is a schematic cross-sectional view illustrating a light source module according to an embodiment of the present disclosure; FIG. 1B is a schematic cross-sectional view, taken along line X-X of FIG. 1A; FIGS. 2A and 2B are schematic cross-sectional views illustrating modifications of an external terminal applicable to a cap unit of FIG. 1; FIGS. 3A and 3B are schematic cross-sectional views illustrating modifications of a light source unit of FIG. 1; FIGS. 4A through 4C are schematic views illustrating examples of a wavelength conversion unit of FIG. 1; FIGS. 5A through 5C are schematic views illustrating modifications of the wavelength conversion unit of FIGS. 4A through 4C; and FIGS. 6A and 6B are schematic cross-sectional views illustrating modifications of the wavelength conversion unit and the light source unit of FIG. 1.

With reference to FIGS. 1A through 6B, a light source module 10 according to an embodiment of the present disclosure includes a cover unit 100, a cap unit 200, a light source unit 300 and a wavelength conversion unit 400.

The cover unit 100 may have a pipe structure in which an internal hollow space is formed. One end or both ends of the cover unit 100 may be open.

The cover unit 100 may be formed of a resin material or a glass material having superior light transmittance. The cover unit 100 may include a diffusion material in the internal space thereof for light to be uniformly diffused and emitted to the outside, and have a rough structure on an outer surface thereof.

The cover unit 100 may have a pipe shape having a circular cross-section as shown in FIG. 1B; however, a sectional shape of the cover unit 100 is not limited thereto. The cover unit 100 may have various sectional shapes such as triangular, rectangular, or other polygonal shapes. Also, the cover unit 100 may have a curved pipe structure having a predetermined curvature as well as a straight pipe structure.

The cap unit 200 may be detachably coupled to the one open end or both open ends of the cover unit 100. A sectional shape of the cap unit 200 may correspond to that of the cover unit 100 such that the cap unit 200 may seal the internal space of the cover unit 100.

The cap unit 200 may include an external terminal 210 on an outer surface thereof opposite to the cover unit 100. At least one pair of external terminals 210 may be provided. One end of the external terminal 210 protrudes outwardly of the outer surface of the cap unit 200 and the other end thereof extends to an inner surface of the cap unit 200 facing the cover unit 100 to thereby be electrically connected to the light source unit 300 to be described below.

The cap unit 200 may serve as an electrical connection terminal for supplying power from the outside to the light source unit 300 mounted on the inner surface of the cap unit 200 through the external terminals 210. Further, the cap unit 200 may serve as a heat sink releasing heat generated in the light source unit 300 to the outside. In order to enhance heat dissipation efficiency, the cap unit 200 may be formed of a high heat dissipation material having superior thermal conductivity.

The light source unit 300 may be mounted on the inner surface of the cap unit 200 while being covered by the cover unit 100. The light source unit 300 may include a light emitting device 310, a substrate 320 on which the light emitting device 310 is mounted, and a reflecting part 330 formed on the substrate 320 for reflecting light emitted from the light emitting device 310 to an inside of the wavelength conversion unit 400. For this purpose, the reflecting part 330 includes an inner reflective surface 331 in a central portion thereof exposed to the light emitting device 310.

The light emitting device 310 may be a semiconductor device capable of emitting light having a predetermined wavelength when external power is applied thereto. The light emitting device 310 may include a light emitting diode (LED). The light emitting device 310 may emit light of any color including blue, red or green light, etc., according to a material contained therein, and may also produce white light.

The light emitting device 310 may include an LED chip or an LED chip package. A single light emitting device may be provided as illustrated; however, the disclosure is not limited thereto. For example, a plurality of light emitting devices may be arrayed in a matrix form. In this case, the plurality of light emitting devices may be homogeneous light emitting devices emitting light having the same wavelength, or heterogeneous light emitting devices emitting light having different wavelengths.

The substrate 320 may be formed of a material having high thermal conductivity, such that it may facilitate the dissipation of heat generated when the light emitting device 310 mounted on a surface of the substrate 320 emits light. The substrate 320, for example, a type of printed circuit board (PCB), may be formed of an organic resin material containing epoxy, triazine, silicon, polyimide, or the like, or any other organic resin materials, or combinations thereof. Further, the substrate 320 may be formed of a ceramic material such as AlN, $Al_2O_3$, or the like, or a metal and a metal compound, or combinations thereof. Specifically, the substrate 320 may include a metal-core printed circuit board (MCPCB) or a metal PCB.

The substrate 320 may include a circuit pattern 321 formed on a surface (mounting surface) thereof on which the light emitting device 310 is mounted and electrically connected to the light emitting device 310. The circuit pattern 321 and the external terminal(s) 210 may be electrically connected by an electrical wire 322 penetrating the substrate 320. An exemplary electrical wire 322 is shown as penetrating the substrate 320 in FIG. 1A; however, the disclosure is not limited thereto. Alternatively, as shown in FIG. 2B, a conductive via 323 penetrating the substrate 320 may be used to connect the circuit pattern 321 to the external terminal(s) 210. In this case, the substrate 320 may be attached to the entirety of the inner surface of the cap unit 200, and an increase in the contact surface therebetween may contribute to enhancing heat dissipation. In another variation, as shown in FIG. 2A, the external terminal(s) 210 may penetrate the substrate 320 to be extended up to the mounting surface of the light emitting device 310 such that it may be directly connected to the circuit pattern 321.

The reflecting part 330 may be formed on the surface of the substrate 320 on which the light emitting device 310 is mounted, while covering the circuit pattern 321. The reflecting part 330 may have the inner reflective surface 331 in the central portion thereof exposed to the light emitting device 310, such that it may reflect light emitted from the light emitting device 310 into the inside of the wavelength conversion unit 400.

The reflecting part 330 may include a coupling groove 332 at an edge of the inner reflective surface 331 facing the wavelength conversion unit 400 to allow one end of the wavelength conversion unit 400 to be coupled thereto. The coupling groove 332 may be formed to have a step structure at the edge of the inner reflective surface 331, and a sectional shape thereof may correspond to that of the one end of the wavelength conversion unit 400 such that the wavelength conversion unit 400 may be fixedly coupled thereto.

The reflecting part 330 may include an outer reflective surface 333 declined toward the cover unit 100 from the edge of the inner reflective surface 331 at which the coupling groove 332 is formed. Specifically, the outer reflective surface 333, corresponding to an upper surface of the reflecting part 330 with respect to the substrate 320, may be declined from the coupling groove 332 in the central portion toward the cover unit 100 in a direction toward an edge of the outer reflective surface 333. The outer reflective surface 333 may allow light emitted from the wavelength conversion unit 400 to be reflected and emitted in a broader range.

The reflecting part 330 may be formed of a white molding compound having high light reflectivity, low thermal conductivity and high heat-resistance. The reflecting part 330 may reflect light emitted from the light emitting device 310 to increase an amount of light emitted upwardly with respect to the substrate 320. Further, the reflecting part 330 may prevent heat generated in the light emitting device 310 from being transferred to the wavelength conversion unit 400. The white molding compound may include a high heat-resistant thermosetting resin or silicon resin. Further, the white molding compound may be prepared by adding a white pigment, a filling material, a hardening agent, a releasing agent, an oxidation inhibitor, an adhesion improver or the like, or combinations thereof, to a thermoplastic resin.

Meanwhile, a reflective layer (not shown) having high reflectivity may be additionally formed on the inner and outer reflective surfaces 331 and 333, respectively, by coating, deposition, application or the like. The reflective layer may include a high-gloss metal layer.

As shown in FIG. 3A, the light source unit 300 may further include a lens 340 disposed in a space surrounded by the inner reflective surface 331 while covering the light emitting device 310, to thereby adjust an angle of the emitted light. As shown in FIG. 3B, the light source unit 300 may include a sealing part 350, for example, a transparent resin, which seals the light emitting device 310 and is disposed in a space surrounded by the inner reflective surface 331. In this case, the transparent resin may contain at least one type of phosphor.

The wavelength conversion unit 400 may be coupled to the light source unit 300 within the cover unit 100 while covering the light emitting device 310. The wavelength conversion unit 400 may convert a wavelength of light emitted from the light emitting device 310 and output the wavelength converted light through the cover unit 100. The wavelength conversion unit 400 may have a pipe structure in which one end or both ends thereof may be open.

As illustrated, an end of the wavelength conversion unit 400 may be fitted into the coupling groove 332 formed in the reflecting part 330, and when the wavelength conversion unit 400 is fixedly coupled to the coupling groove 332, it may face the light emitting device 310. The wavelength conversion unit 400 fixed to the reflecting part 330 may be disposed to be parallel to the cover unit 100 within the internal space of the cover unit 100.

As shown in FIGS. 1 and 4A, the wavelength conversion unit 400 may be formed by molding a compound of a resin and a single type or a plurality of types of phosphor as a solid-state tube. A thickness of the tube forming a phosphor layer may be adjusted according to the types of the light emitting device 310, optical characteristics, and colors of light to be desired, and may be less than several mm.

Alternatively, as shown in FIG. 4B, the wavelength conversion unit 400 may be formed as a light transmission tube 410 having a double-wall structure including an outer wall 411, an inner wall 412, and an accommodating space between the outer wall 411 and inner wall 412. A wavelength conversion material 420 may be disposed in the accommodating space. A thickness of the wavelength conversion material 420 forming a phosphor layer may be adjusted by altering a gap between the outer and inner walls 411 and 412, respectively.

The wavelength conversion material 420 may include, for example, a compound of a resin and a single type or a plurality of types of phosphor, or a liquid-state quantum dot phosphor, or combinations thereof. A quantum dot phosphor may be capable of implementing all wavelength ranges of visible light, thereby allowing for more vivid and natural-type light; however, it is vulnerable to heat and its liquid state may be problematic when applied. However, the light transmission tube 410 provided in this embodiment of the present disclosure may allow the liquid-state quantum dot phosphor to be applied in an accurately controlled amount by filling the tube with the quantum dot phosphor. Further, the light transmission tube 410 may separate the quantum dot phosphor from the light source unit 300, such that it may prevent deterioration due to heat generated when the light emitting device 310 emits light.

Alternatively, as shown in FIG. 4C, the wavelength conversion unit 400 may be formed by coating at least one of inner and outer peripheral surfaces of a light transmission tube 410' having a single wall structure with a compound of a resin and a single type or a plurality of types of phosphor.

The wavelength conversion unit 400 may further include a core 430 formed of a light guide material disposed in the internal hollow space thereof as shown in FIGS. 5A through 5C. FIG. 5A shows a core 430 provided in the wavelength conversion unit 400 of FIG. 4A. FIG. 5B shows a core 430 provided in the wavelength conversion unit 400 of FIG. 4B. FIG. 5C shows the wavelength conversion unit 400 of FIG. 5B without the inner wall 412.

The core 430 having light guide characteristics may serve to uniformly transmit light emitted from the light source unit 300 from one end of the wavelength conversion unit 400 to the other end thereof. Therefore, the core 430 may allow the wavelength converted light excited by the phosphor to be uniformly emitted in the overall ranges of the wavelength conversion unit 400.

Meanwhile, as shown in FIG. 6A, in a case in which the wavelength conversion unit 400 has the core 430 therein, the inner reflective surface 331 may be filled with a high heat-resistant resin to be in contact with the core 430. As shown in FIG. 6B, in a case in which the light source unit 300 includes the lens 340, the core 430 may have a concave groove in an end thereof, such that the lens 340 is accommodated therein.

Figure 7A:
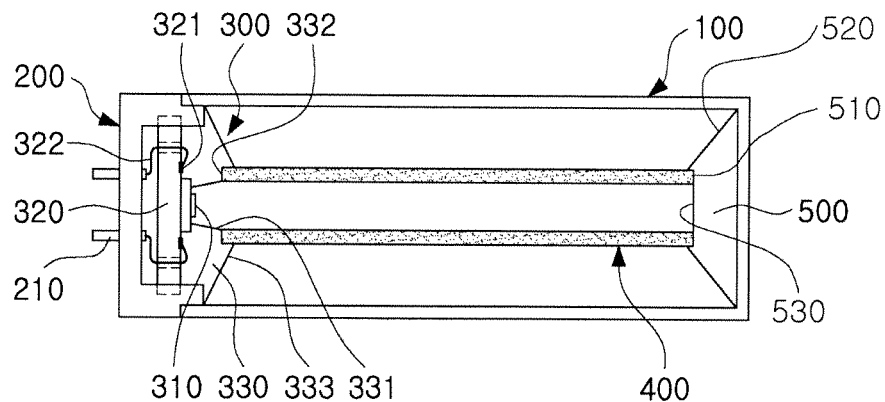
FIGS. 7A and 7B are views schematically illustrating a light source module according to another embodiment of the present disclosure.
Figure 7B:
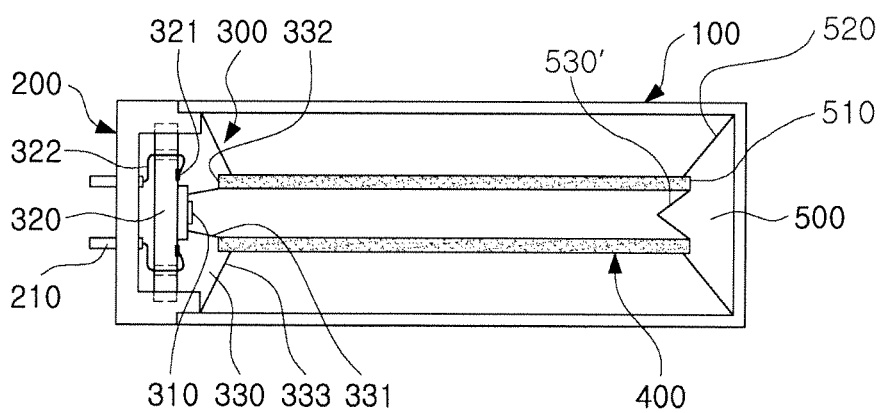

Hereinafter, a light source module according to another embodiment of the present disclosure will be described with reference to FIGS. 7A and 7B. A basic structure of the light source module according to the embodiment shown in FIGS. 7A and 7B is substantially the same as the light source module according to the embodiment shown in FIGS. 1 through 6B, except that an auxiliary reflecting part 500 is further included therein. Accordingly, a repeated description thereof will be omitted and the features of the auxiliary reflecting part 500 will be primarily described in detail.

FIGS. 7A and 7B are schematic views illustrating a light source module according to another embodiment of the present disclosure.

As shown in FIGS. 7A and 7B, the auxiliary reflecting part 500 may be formed of the same material as that of the reflecting part 330, and have a shape corresponding thereto. Specifically, similar to the reflecting part 330, the auxiliary reflecting part 500 includes a coupling groove 510 in a central portion thereof to which the wavelength conversion part 400 is coupled, and an outer reflective surface 520 declined from the coupling groove 510 toward the cover unit 100 in a direction toward an edge of the outer reflective surface 520. A reflective layer (not shown) having high reflectivity may be additionally formed on the outer reflective surface 520 by coating, deposition, application or the like. The reflective layer may include a high-gloss metal layer.

The auxiliary reflecting part 500 may be disposed on an inner surface of a closed end of the cover unit 100 to face the reflecting part 330. Therefore, the wavelength conversion unit 400 may be fixedly coupled to the reflecting part 330 and the auxiliary reflecting part 500 respectively provided on both ends of the wavelength conversion unit 400.

Meanwhile, the wavelength conversion unit 400 may have a tube having both ends open, as distinguished from a blind tube having only one end open exemplified in FIG. 1. The auxiliary reflecting part 500 to which an end of the wavelength conversion unit 400 is coupled may have a flat inner reflective surface 530 as shown in FIG. 7A. The inner reflective surface 530 may be formed to protrude into a space surrounded by the wavelength conversion unit 400 as shown in FIG. 7B.

Even in a case in which the light source unit 300 is provided only at one end of the wavelength conversion unit 400, the auxiliary reflecting part 500 may be provided at the other end of the wavelength conversion unit 400 at which the light source unit 300 is not provided, such that light emitted from the light source unit 300 may be reflected to thereby maintain uniform light density in the overall ranges of the wavelength conversion unit 400. Further, the light wavelength-converted by the wavelength conversion unit 400 may also be reflected by the outer reflective surfaces 333 and 520 such that it may be maximally emitted to the outside of the cover unit 100.

Figure 8A:
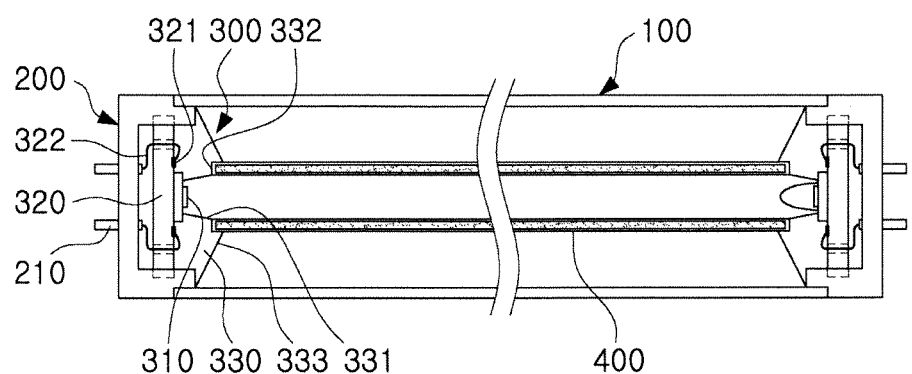
FIGS. 8A and 8B are views schematically illustrating a light source module according to another embodiment of the present disclosure.
Figure 8B:
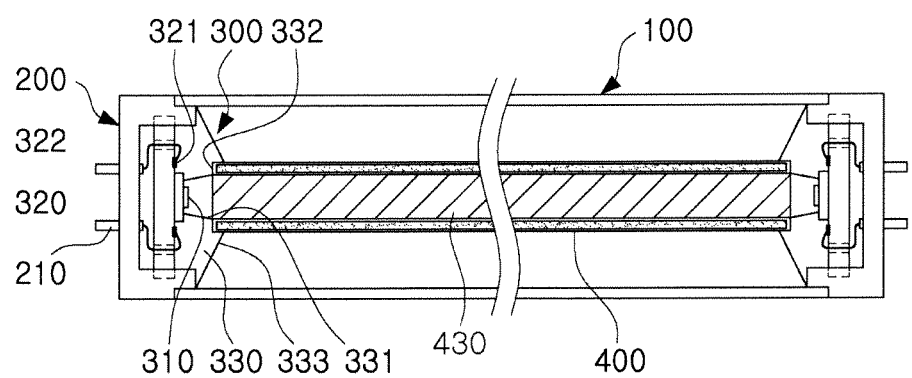

Hereinafter, a light source module according to another embodiment of the disclosure will be described with reference to FIGS. 8A and 8B. A basic structure of the light source module according to the embodiment shown in FIGS. 8A and 8B is substantially the same as the light source module according to the embodiments shown in FIGS. 1 through 7B, except that the cover unit, the wavelength conversion unit and the light source unit have a different structure therefrom. Accordingly, a repeated description thereof will be omitted and the different features of the cover unit, the wavelength conversion unit and the light source unit will be primarily described in detail.

FIGS. 8A and 8B are schematic views illustrating a light source module according to another embodiment of the present disclosure.

As shown in FIGS. 8A and 8B, the cover unit 100 may have a tube structure having both ends open, as distinguished from a blind tube having one end open exemplified in FIGS. 1 through 7B. Further, the cap unit 200 having the light source unit 300 mounted thereon may be detachably coupled to both open ends of the cover unit 100.

The wavelength conversion unit 400 disposed within the cover unit 100 may have both ends open. Both ends of the wavelength conversion unit 400 may be coupled to both ends of the cover unit 100, respectively, through the reflecting part 330 of the light source unit 300 coupled to both ends of the cover unit 100. The wavelength conversion unit 400 may have an internal hollow space as shown in FIG. 8A, or may have the core 430 provided therein as shown in FIG. 8B.

Figure 9A:
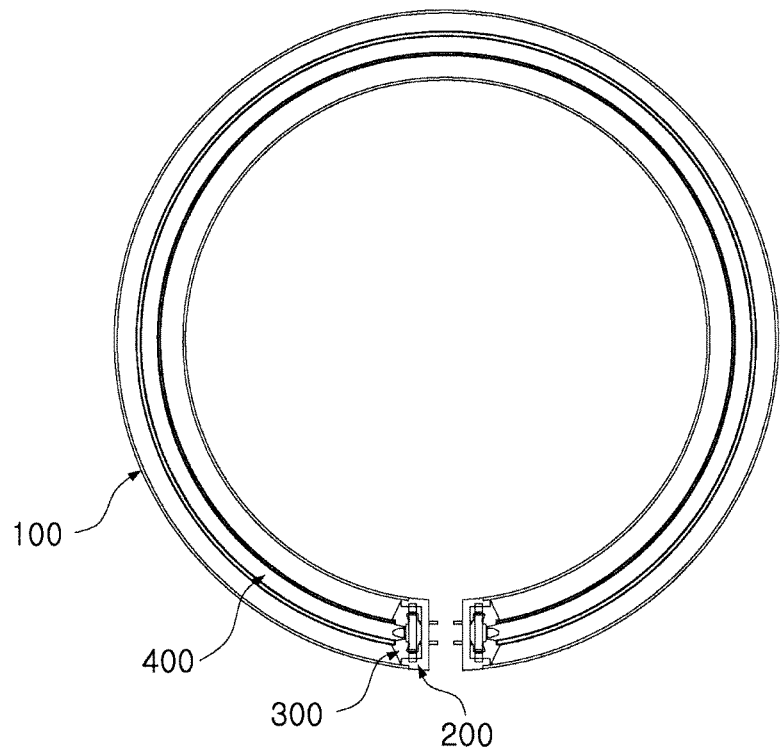
FIGS. 9A through 9C are views schematically illustrating a light source module according to another embodiment of the present disclosure.
Figure 9B:
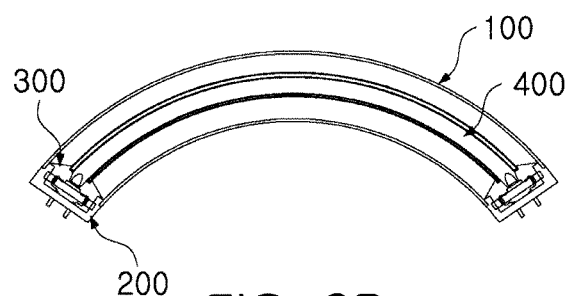
Figure 9C:
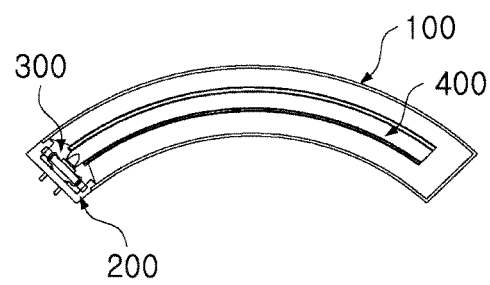

Meanwhile, the cover unit 100 and the wavelength conversion unit 400 may have a straight structure as shown in FIGS. 1 through 8. Alternatively, the cover unit 100 and the wavelength conversion unit 400 may have a curved structure as shown in FIGS. 9A through 9C. Therefore, they may be applicable to illumination apparatuses having various structures.

An illumination apparatus according to another embodiment of the present disclosure will be described with reference to FIGS. 10 through 11B.

Figure 10:
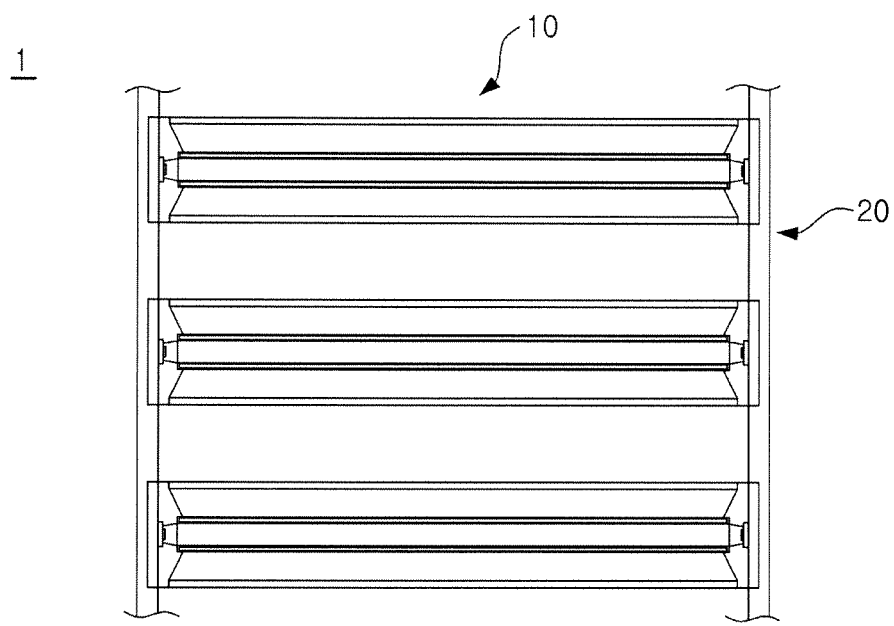
FIG. 10 is a view schematically illustrating an illumination apparatus according to an embodiment of the present disclosure.
Figure 11A:
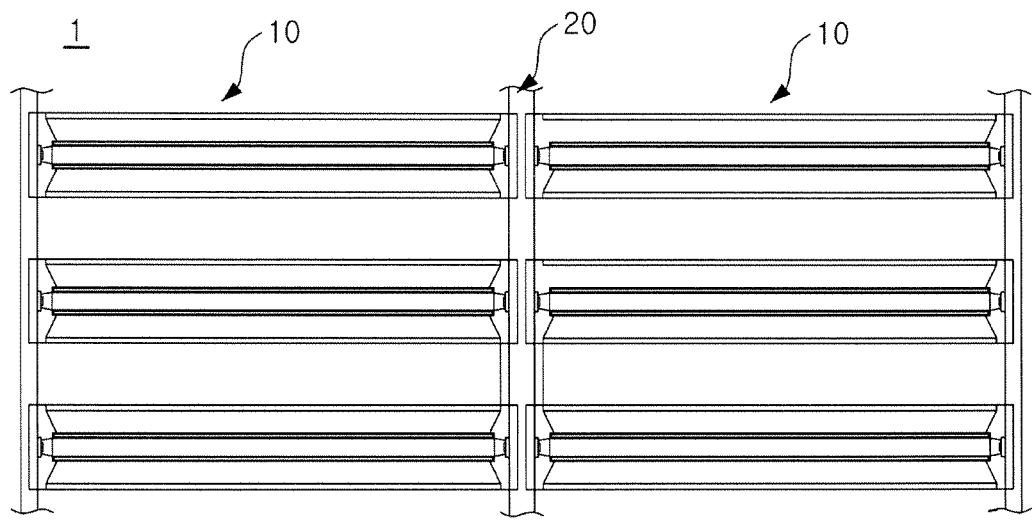
FIGS. 11A and 11B are views schematically illustrating modifications of the illumination apparatus of FIG. 10.
Figure 11B:
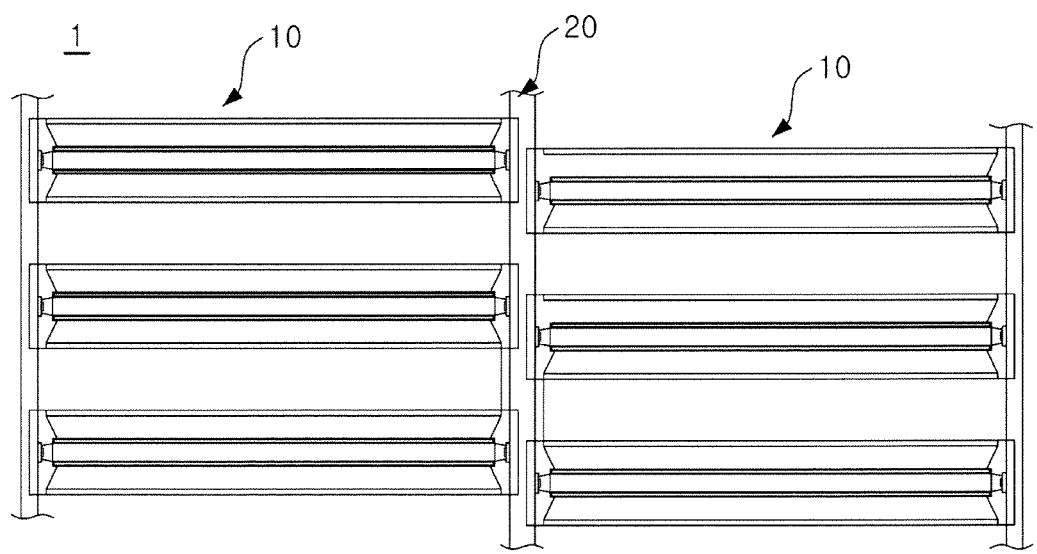

FIG. 10 is a view schematically illustrating an illumination apparatus according to an embodiment of the present disclosure; and FIGS. 11A and 11B are views schematically illustrating modifications of the illumination apparatus of FIG. 10.

With reference to FIGS. 10 through 11B, an illumination apparatus 1 according to an embodiment of the present disclosure may include the light source module 10 and a frame unit 20.

Here, the structure of the light source module 10 in this embodiment is substantially the same as that shown in FIGS. 1 through 9C, so a detailed description thereof will be omitted.

The frame unit 20 may have one or more light source modules 10 detachably mounted thereon and supplies power to the light source modules 10. The frame unit 20 may be formed as a metallic frame in order to stably support the light source modules 10.

As shown in FIGS. 11A and 11B, the plurality of light source modules 10 may be arrayed in the frame unit 20 in horizontal and/or vertical directions. In this case, the light source modules 10 may be arrayed in a straight row as shown in FIG. 11A, or may be arranged in a zigzag form as shown in FIG. 11B.

An illumination apparatus according to another embodiment of the present disclosure will be described with reference to FIGS. 12 through 14.

Figure 12:
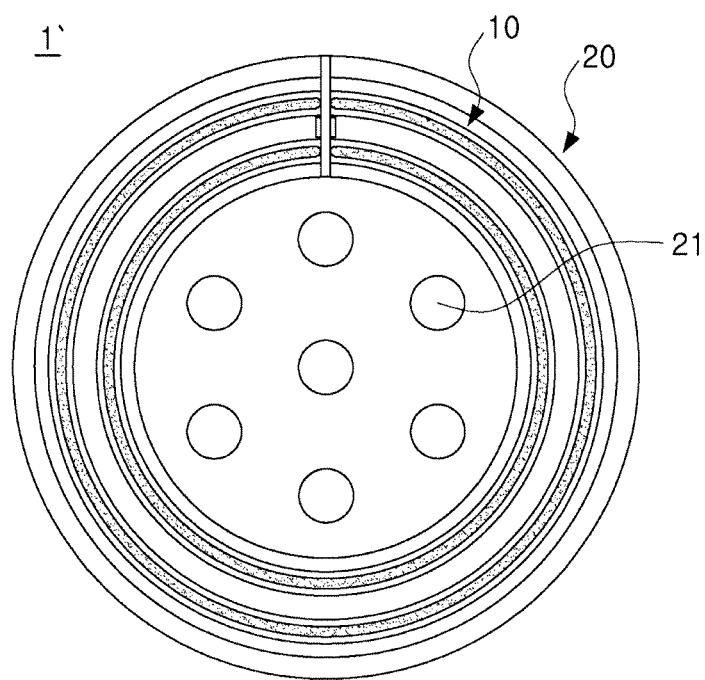
FIG. 12 is a view schematically illustrating an illumination apparatus according to another embodiment of the present disclosure.
Figure 13A:
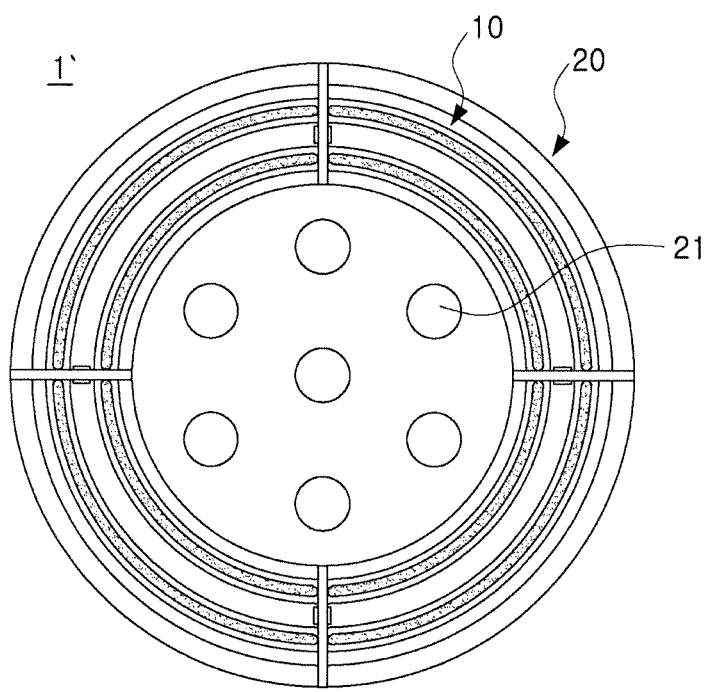
FIGS. 13A and 13B are views schematically illustrating modifications of the illumination apparatus of FIG. 12.
Figure 13B:
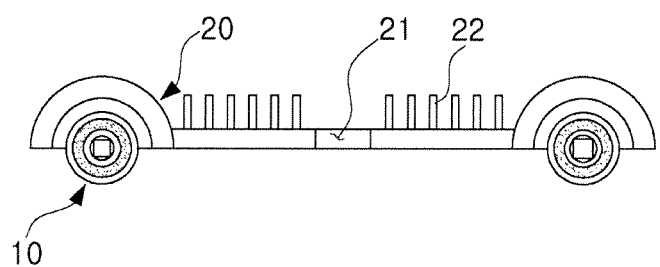

FIG. 12 is a view schematically illustrating an illumination apparatus according to another embodiment of the present disclosure; FIGS. 13A and 13B are views schematically illustrating modifications of the illumination apparatus of FIG. 12; and FIG. 14 is a schematic cut-away perspective view of FIG. 13.

Figure 14:
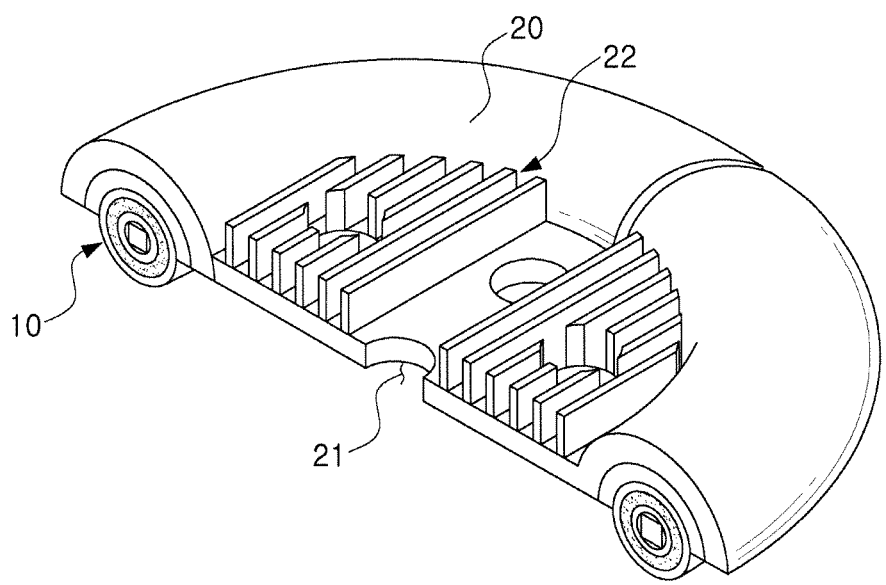
FIG. 14 is a schematic cut-away perspective view of FIG. 13.

With reference to FIGS. 12 through 14, the illumination apparatus 1' according to this embodiment of the present disclosure may include the light source module 10 and the frame unit 20.

Here, the structure of the light source module 10 in this embodiment is substantially the same as that shown in FIGS. 1 through 9C, so a detailed description thereof will be omitted.

The frame unit 20 may have one or more light source modules 10 detachably mounted thereon and supplies power to the light source modules 10. The frame unit 20 may be formed as a metallic frame in order to stably support the light source modules 10.

As shown in FIG. 12, the frame unit 20 may have a circular structure. Accordingly, the light source module 10, when mounted on the frame unit 20, may be arranged in a circular manner. Alternatively, the plurality of light source modules 10 may be consecutively connected as shown in FIG. 13A.

The frame unit 20 may have a heat sink on one surface thereof, the heat sink including one or more heat dissipation holes 21 and a heat dissipation fin 22 for releasing heat generated in the light source module(s) 10.

As set forth above, in a light source module and an illumination apparatus having the same according to embodiments of the disclosure, the number of light emitting devices used as a light source may be reduced to thereby achieve a reduction in manufacturing costs, and an amount of heat generated therein may be reduced to thereby ensure uniform light quality.

While the present disclosure has been shown and described in connection with the embodiments, it will be apparent to those having ordinary skill in the art that modifications and variations can be made without departing from the spirit and scope of the disclosure as defined by the appended claims.

What is claimed is:

1. A light source module comprising:
   a cover unit having a pipe structure with one open end or two open ends;
   a cap unit coupled to the one open end or two open ends of the cover unit;
   a light source unit including a light emitting device, said light source unit mounted on the cap unit and covered by the cover unit; and
   a wavelength conversion unit disposed in an internal space of the cover unit and coupled to the light source unit while covering the light emitting device, the wavelength conversion unit converting a wavelength of light emitted from the light emitting device to allow the wavelength-converted light to be emitted through the cover unit,
   wherein the wavelength conversion unit includes a compound of a resin and a single type or a plurality of types of phosphor.

2. The light source module of claim 1, wherein the wavelength conversion unit has a pipe structure with one open end or two open ends, and is disposed parallel to the cover unit within the internal space of the cover unit.

3. A light source module comprising:
   a cover unit having a pipe structure with one open end or two open ends;
   a cap unit coupled to the one open end or two open ends of the cover unit;
   a light source unit including a light emitting device, said light source unit mounted on the cap unit and covered by the cover unit; and
   a wavelength conversion unit disposed in an internal space of the cover unit and coupled to the light source unit while covering the light emitting device, the wavelength conversion unit converting a wavelength of light emitted from the light emitting device to allow the wavelength-converted light to be emitted through the cover unit,
   wherein the wavelength conversion unit includes a light transmission tube having a double wall structure with an accommodating space between an outer and inner wall, and a wavelength conversion material disposed in the accommodating space.

4. The light source module of claim 3, wherein the wavelength conversion material includes a compound of a resin and a single type or a plurality of types of phosphor, or a liquid-state quantum dot phosphor.

5. A light source module comprising
a cover unit having a pipe structure with one open end or two open ends;
a cap unit coupled to the one open end or two open ends of the cover unit;
a light source unit including a light emitting device, said light source unit mounted on the cap unit and covered by the cover unit; and
a wavelength conversion unit disposed in an internal space of the cover unit and coupled to the light source unit while covering the light emitting device, the wavelength conversion unit converting a wavelength of light emitted from the light emitting device to allow the wavelength-converted light to be emitted through the cover unit,
wherein the wavelength conversion unit includes a light transmission tube, wherein a compound of a resin and a single type or a plurality of types of phosphor is coated on at least one of an inner peripheral surface and an outer peripheral surface of the light transmission tube.

6. The light source module of claim 2, wherein the wavelength conversion unit further includes a core formed of a light guide material disposed in an internal space of the wavelength conversion unit.

7. The light source module of claim 1, wherein the light source unit includes:
a substrate having the light emitting device mounted thereon; and
a reflecting part formed on the substrate and having an inner reflective surface in a central portion thereof exposed to the light emitting device, the inner reflective surface reflecting the light emitted from the light emitting device inwardly to the wavelength conversion unit.

8. The light source module of claim 7, wherein the reflecting part has a coupling groove at an edge of the inner reflective surface facing the wavelength conversion unit, the coupling groove having one end of the wavelength conversion unit coupled thereto, and
the wavelength conversion unit coupled to the coupling groove is fixed to face the light emitting device.

9. The light source module of claim 7, wherein the light source unit further includes a lens covering the light emitting device and disposed in a space surrounded by the inner reflective surface.

10. The light source module of claim 1, further comprising an auxiliary reflecting part disposed on an inner surface of a closed end of the cover unit having one open end, and coupled to the wavelength conversion unit to thereby fix the wavelength conversion unit together with the light source unit, the wavelength conversion unit having one end coupled to the light source unit and another end coupled to the auxiliary reflecting part.

11. The light source module of claim 1, wherein the cap unit includes an external terminal having one end protruding outwardly and another end electrically connected to the light emitting device and supplying power to the light emitting device.

12. An illumination apparatus comprising:
a light source module including:
a cover unit having a pipe structure with one open end or two open ends;
a cap unit coupled to the one open end or two open ends of the cover unit;
a light source unit including a light emitting device, said light source unit mounted on the cap unit and covered by the cover unit; and
a wavelength conversion unit disposed in an internal space of the cover unit and coupled to the light source unit while covering the light emitting device, the wavelength conversion unit converting a wavelength of light emitted from the light emitting device to allow the wavelength-converted light to be emitted through the cover unit; and
a frame unit including one or more light source modules detachably mounted thereon and supplying power to the one or more light source modules.

13. The illumination apparatus of claim 12, wherein the frame unit includes at least two light source modules detachably mounted thereon, the at least two light source modules are arranged in at least one of a horizontal and vertical direction.

14. The illumination apparatus of claim 12, wherein the one or more light source modules are arranged in a circular manner.

15. A light source module comprising:
a housing;
a light source unit for emitting light; and
a wavelength conversion unit for converting a wavelength of light emitted from the light source unit,
wherein the light source unit and wavelength conversion unit are arranged within an internal space of the housing such that at least a portion of the light emitted from the light source unit passes through the wavelength conversion unit.

16. The light source module of claim 15, further including a reflecting part for reflecting light emitted from the light source unit to the wavelength conversion unit.

17. The light source module of claim 16, wherein the reflecting part extends from the light source unit to the wavelength conversion unit.

18. The light source module of claim 17, wherein the reflecting part includes an inner reflective surface extending from the light source unit to the wavelength conversion unit and an outer reflective surface extending from an outer surface of the wavelength conversion unit to an inner surface of the housing.

19. The light source module of claim 15, further including an external terminal having one end protruding outwardly from an end of the housing and another end electrically connected to the light source unit for supplying power to the light source unit.

* * * * *